(12) United States Patent
Shi et al.

(10) Patent No.: US 9,560,095 B2
(45) Date of Patent: Jan. 31, 2017

(54) METHOD AND SYSTEM FOR REMOTE MEETINGS

(71) Applicant: Cisco Technology, Inc., San Jose, CA (US)

(72) Inventors: Qi Shi, Suzhou (CN); Hua Ouyang, Suzhou (CN); Huahua Yin, Suzhou (CN); Yunwei Luo, Suzhou (CN)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 14/501,136

(22) Filed: Sep. 30, 2014

(65) Prior Publication Data

US 2016/0094675 A1   Mar. 31, 2016

(51) Int. Cl.

| | |
|---|---|
| *G06F 15/16* | (2006.01) |
| *H04L 29/06* | (2006.01) |
| *G06F 9/54* | (2006.01) |
| *H04N 21/231* | (2011.01) |
| *H04N 21/43* | (2011.01) |
| *H04N 21/433* | (2011.01) |
| *H04N 21/442* | (2011.01) |
| *H04L 29/08* | (2006.01) |

(52) U.S. Cl.
CPC ........... *H04L 65/403* (2013.01); *G06F 9/542* (2013.01); *H04N 21/23106* (2013.01); *H04N 21/4302* (2013.01); *H04N 21/4331* (2013.01); *H04N 21/44204* (2013.01); *H04L 67/14* (2013.01)

(58) Field of Classification Search
CPC ...... H04L 29/08; H04L 29/06; H04L 67/2842; H04L 65/403; H04L 67/42; G06F 9/54; G06F 9/542

USPC .......................................................... 709/213
See application file for complete search history.

(56) References Cited

U.S. PATENT DOCUMENTS

| | | | |
|---|---|---|---|
| 8,250,141 B2 | 8/2012 | Xiao et al. | |
| 8,698,872 B2 | 4/2014 | Begeja et al. | |
| 2008/0055272 A1 | 3/2008 | Anzures et al. | |
| 2009/0249222 A1 | 10/2009 | Schmidt et al. | |
| 2011/0249073 A1* | 10/2011 | Cranfill .................. | H04N 7/147 348/14.02 |
| 2012/0169833 A1* | 7/2012 | Wu ........................ | H04N 7/142 348/14.08 |

(Continued)

FOREIGN PATENT DOCUMENTS

WO   2013/026457   2/2013

OTHER PUBLICATIONS

GS.STAT_COUNTER, available at: gs.statcounter.com/#mobile_resolution-ww-monthly-201301-201301-bar, Jan. 1, 2013.

(Continued)

*Primary Examiner* — Tauqir Hussain
(74) *Attorney, Agent, or Firm* — Samuel M. Katz

(57) ABSTRACT

In one embodiment, a client device determines that a client device display screen is displaying a video image as enlarged, compares received regions of a received video image with regions of the displayed video image, determines that the compared regions of the received video image are different from the regions of the displayed video image, and stores received video frames comprising the received video image in a cache memory. Related systems, apparatus, and methods are also described.

20 Claims, 12 Drawing Sheets

(56) References Cited

U.S. PATENT DOCUMENTS

| | | | |
|---|---|---|---|
| 2013/0083151 A1* | 4/2013 | Kim | H04L 65/1069 |
| | | | 348/14.07 |
| 2014/0063174 A1* | 3/2014 | Junuzovic | G06Q 10/101 |
| | | | 348/14.02 |
| 2014/0125755 A1 | 5/2014 | Thomas | |
| 2014/0208211 A1 | 7/2014 | Luo et al. | |
| 2015/0201161 A1* | 7/2015 | Lachapelle | H04N 7/15 |
| | | | 348/14.07 |

OTHER PUBLICATIONS

Behera et al, "Looking at Projected Documents: Event Detection & Document Identification", 2004 IEEE International Conference on Multimedia and Expo (ICME), Jun. 27, 2004.
"UIScrollView Class Reference", Sep. 18, 2013.
Brother Online, "Web and Conferencing Solutions—Brother Omnijoin", Oct. 5, 2014, available at: http://www.nefsis.com/Best-Video-Conferencing-Software/howto-playmovies.html.
Android Developers, Websettings.Zoomdensity, Jul. 7, 2014.

* cited by examiner

METHOD AND SYSTEM FOR REMOTE MEETINGS

TECHNICAL FIELD

The present disclosure generally relates to the user experience of an on-line meeting.

BACKGROUND

As the world becomes interconnected and "flatter", more and more people are collaborating across the world, whether for business or other reasons. One consequence of this is that meetings are typically moving from being face-to-face meetings to virtual meetings. That is to say, participants are attending more meetings on-line. Since more and more people have smart phones and other hand held devices, many people are now using those devices, which have relatively small-screens, in order to attend these meetings.

When attending an on-line meeting, an attendee using a device with a small screen might want to zoom in on slides, text, or other displays. Such items might, however, be difficult to view, when not zoomed in, on a small screen.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method, system and apparatus for a client device for remote meetings are described. A client device determines that a client device display screen is displaying a video image as enlarged, compares received regions of a received video image with regions of the displayed video image, determines that the compared regions of the received video image are different from the regions of the displayed video image, and stores received video frames comprising the received video image in a cache memory. Related systems, apparatus, and methods are also described.

Exemplary Embodiment

Figure 1:
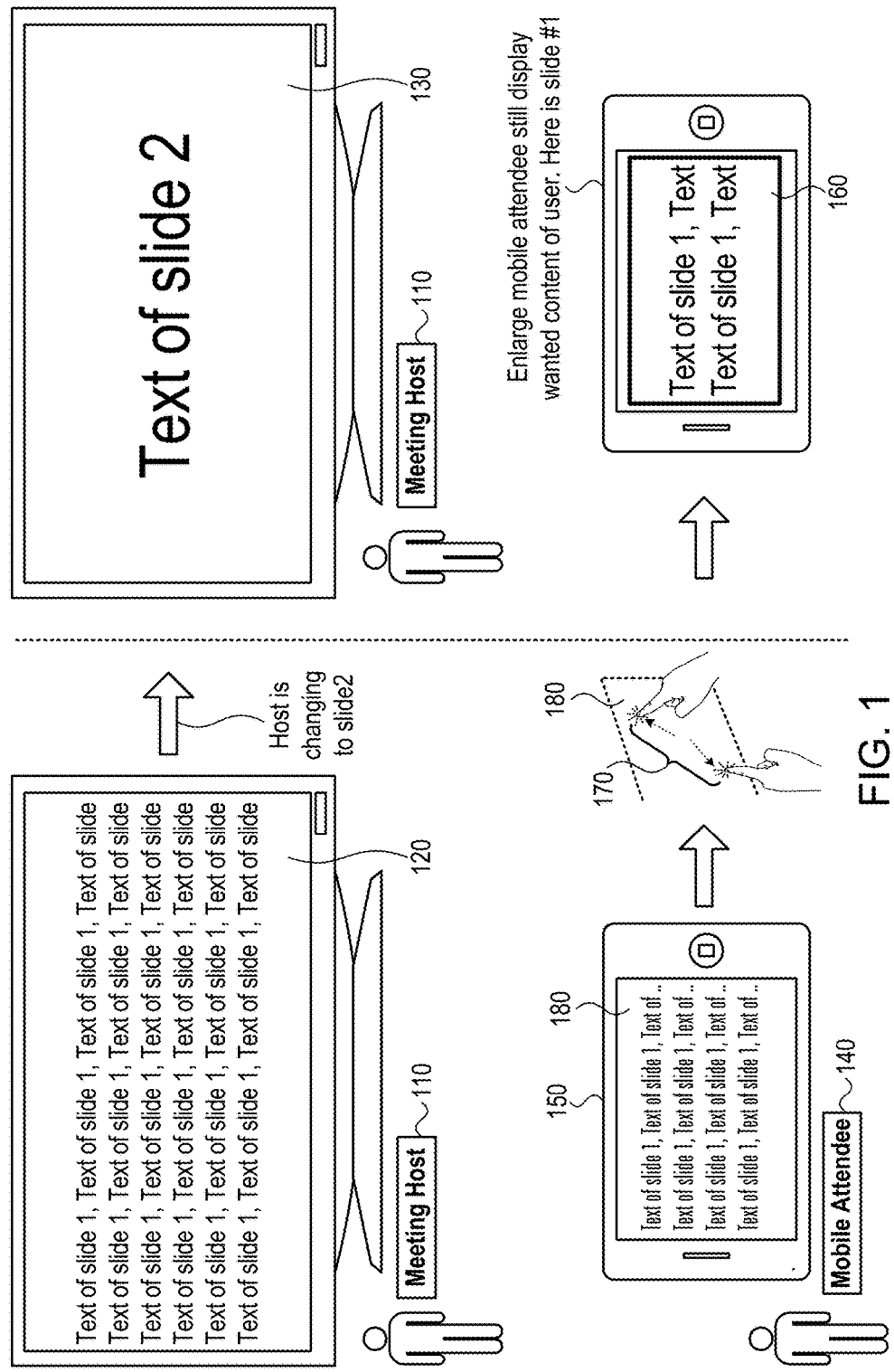
FIG. 1 is a simplified pictorial illustration of a situation where a meeting host of an on-line meeting is changing from a first slide to a second slide, and an attendee of the meeting, viewing the meeting on a mobile device is zoomed in on the first slide.

Reference is now made to FIG. 1, which is a simplified pictorial illustration of a situation where a meeting host 110 of an on-line meeting is changing from a first slide 120 to a second slide 130. An attendee 140 of the meeting, viewing the meeting on a mobile device 150, is zoomed in on the first slide 160. When attending the on-line meeting, the attendee 140 may zoom in 170 with the small screen mobile device 150 in order to enlarge slides, text, or other displays, which might be difficult to see on a small display screen 180 when not zoomed in. In an embodiment described herein, if the attendee 140 zooms in 170 the display screen 180 of the mobile device 150 at the moment when the meeting host 110 changes from the first slide 120 to the second slide 130, the display screen 180 of the mobile device 150 continues to display the zoomed in first slide 160, as though the display is paused, and not updating.

Figure 2:
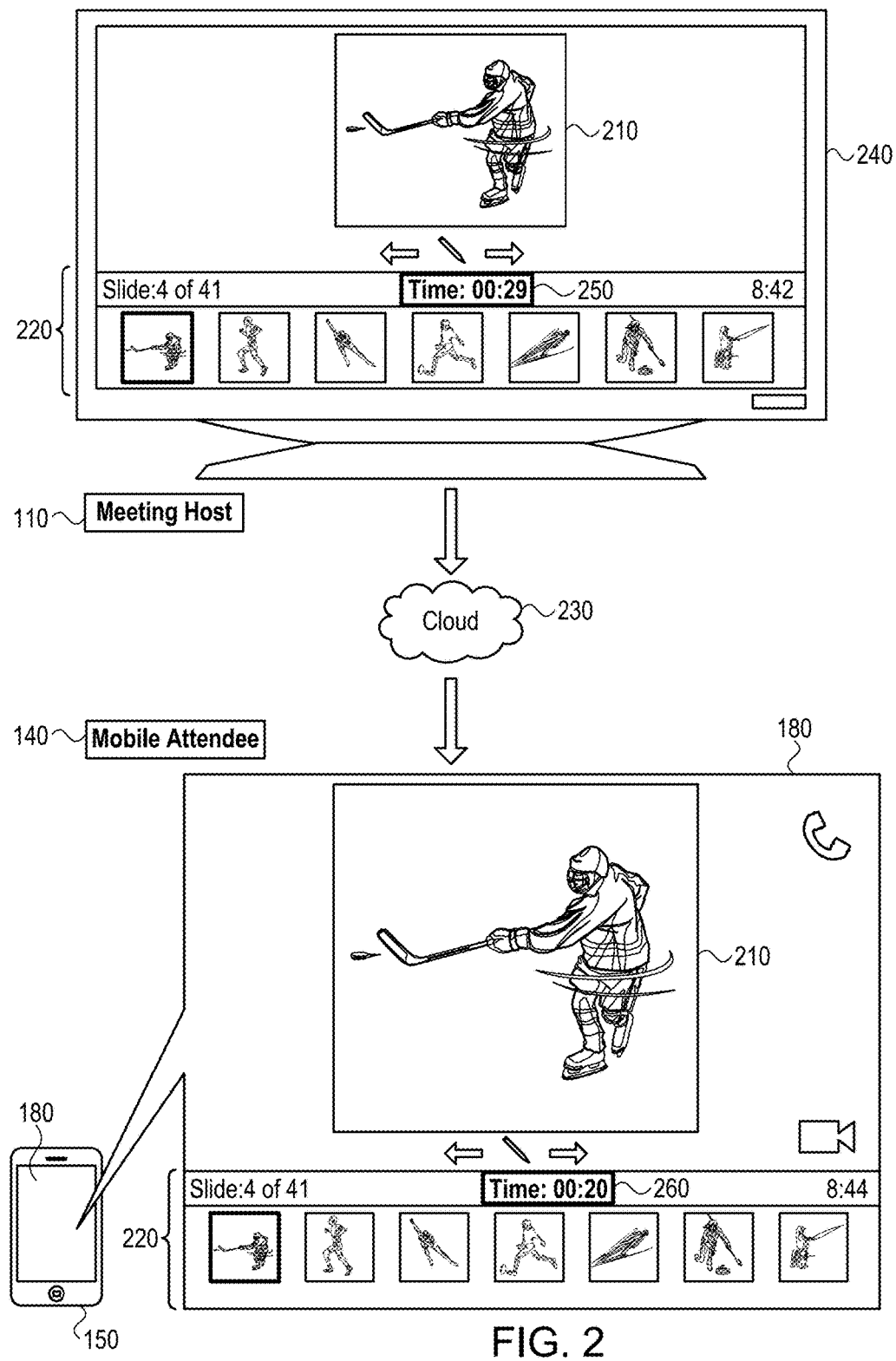
FIG. 2 is a simplified pictorial illustration of a situation where the meeting host of an on-line meeting is progressing in some manner with a presentation, and the attendee of the meeting, viewing the meeting on a mobile device, is not zoomed in on the content, but does wish to pause the content of the presentation.

Reference is now made to FIG. 2, which is a simplified pictorial illustration of a situation where the meeting host 110 of an on-line meeting is progressing in some manner with a presentation 210, 220, and the attendee 140 of the meeting, viewing the meeting on a mobile device 150, is not zoomed in on the content 210 (by contrast to FIG. 1), but does wish to pause the content of the presentation 210. In FIG. 2 the meeting host 110 is depicted as sharing a presentation 210, 220 over a cloud network 230. The display 240 of meeting host 110 indicates that elapsed time 250 for the present slide is 00:29 seconds on the mobile device 150 of the meeting host 110. However, because the attendee 140 has effectively paused the presentation, the display screen 180 of the mobile device 150 indicates that the elapsed time 260 is only 00:20 seconds, since the attendee 140 has paused the display, no received updates are displayed on the display screen 180.

Figure 3:
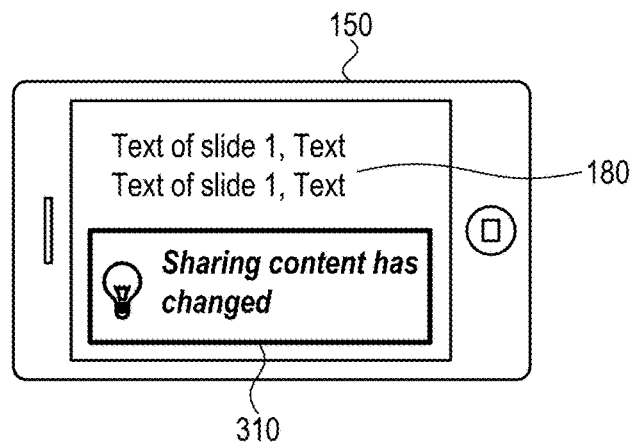
FIG. 3 is a simplified pictorial illustration of the display screen of the mobile device of FIGS. 1 and 2 displaying a notification.
Figure 4:
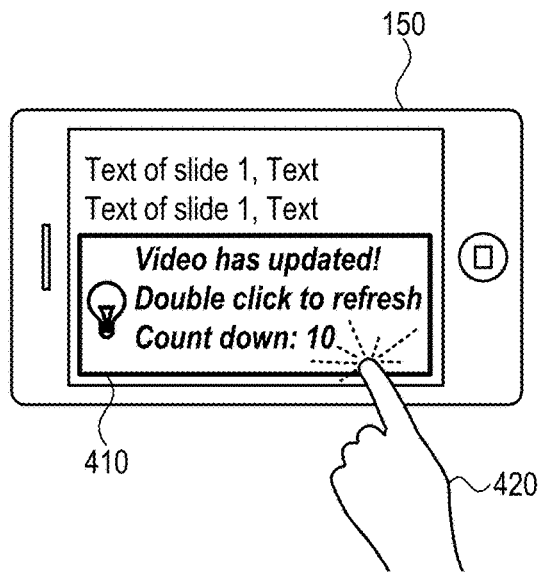
FIG. 4 is a simplified pictorial illustration of the display screen of the mobile device of FIGS. 1 and 2 displaying a second notification.

Reference is now made to FIGS. 3 and 4, which are, respectively, simplified pictorial illustration of the mobile device 150 (of FIGS. 1 and 2) of the attendee 140 (FIG. 1) in various states. FIG. 3 depicts a notification 310 appearing on the display screen 180 of the mobile device 150. The notification 310 notifies the attendee 140 (FIG. 1) that the meeting host 110 (FIG. 1) has changed the content which the meeting host 110 (FIG. 1) is sharing with the attendee 140 (FIG. 1) as well as any other attendees who might be viewing the meeting.

FIG. 4 depicts a mechanism whereby the attendee 140 (FIG. 1) can cause the display screen 180 of the mobile device 150 to refresh, and to come back into synchronization with the content which the meeting host 110 (FIG. 1) is sharing with the attendee 140 (FIG. 1) as well as any other attendees who might be viewing the meeting. In this particular example, a notification 410 is provided to the attendee 140 (FIG. 1) that by double clicking the display screen 180 of the mobile device 150, the display screen 180 of the mobile device 150 will refresh and will display the content presently being presented by the meeting host 110 (FIG. 1). Note that FIG. 4 shows, by way of example, a finger 420 (not shown to scale) in order to indicate that the attendee 140 (FIG. 1) is performing the double click.

It is appreciated that the sequence of events depicted in FIGS. 3 and 4 may be applicable to either of the situations depicted in FIGS. 1 and 2.

It is appreciated that double clicking the display screen 180 of the mobile device 150 is mentioned herein by way of example, and any appropriate manner of interfacing with or actuating the mobile device 150 may be used to input the user interaction with the mobile device 150. For example, and without limiting the generality of the foregoing, a single click on the display screen 180 of the mobile device 150 may be used, actuating a button on the mobile device 150 may be used, or other appropriate user actions known in the art may be taken, in order to input the user's interaction.

Figure 5:
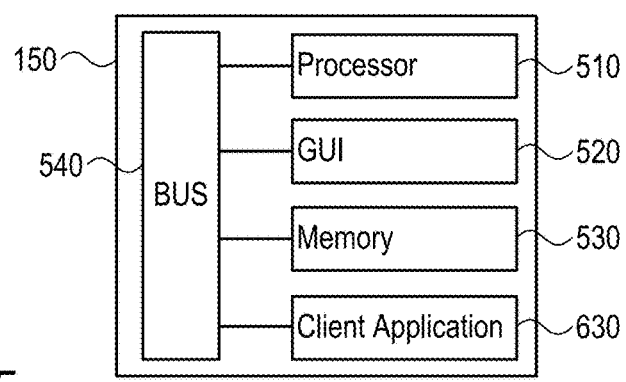
FIG. 5 is a block diagram drawing of the mobile device of FIGS. 1 and 2.

Reference is now made to FIG. 5, which is a block diagram drawing of the mobile device 150 of FIGS. 1 and 2 for use in an embodiment of the present invention. Typical implementations of the mobile device 150 include, but are not limited to a tablet device, smartphone, Internet-enabled television, media center PC, or any other suitable device, such as is known in the art. Although the terms "mobile device 150" and "small screen" are used herein, the device may, in fact, be of any appropriate size, weight, or form factor. The terms "mobile device" and "small screen" are used solely for ease of depiction and description, and are not intended to be limiting.

The mobile device 150 comprises at least one processor 510, a user interface (typically a graphical user interface, GUI) 520, such as the display screen 180 (FIG. 1). The GUI 520 may display a single application, two applications which interact with each other, a Web browser or other appropriate application.

As mentioned above, the mobile device 150 may comprise more than one processor 510, one processor 510 of which may be a special purpose processor operative to perform the method of the present invention described herein. In addition, the mobile device 150 comprises non-transitory computer-readable storage media (i.e. memory) 530. The memory 530 may store instructions, which at least one of the processors 510 may execute, in order to perform the method of the present invention, as described herein. The mobile device 150 also comprises typical and standard hardware and software components as are known in the art.

The mobile device 150 comprises a communications bus 540 or other appropriate hardware, software, or a combination of hardware and software, as is known in the art, in order to facilitate communications between the various components described above comprising the mobile device 150.

The mobile device 150 comprises a client application 630 which will be described in greater detail below.

The mobile device 150 also comprises a storage device (not depicted) which may be used for caching data, such as a video cache.

Figure 6:
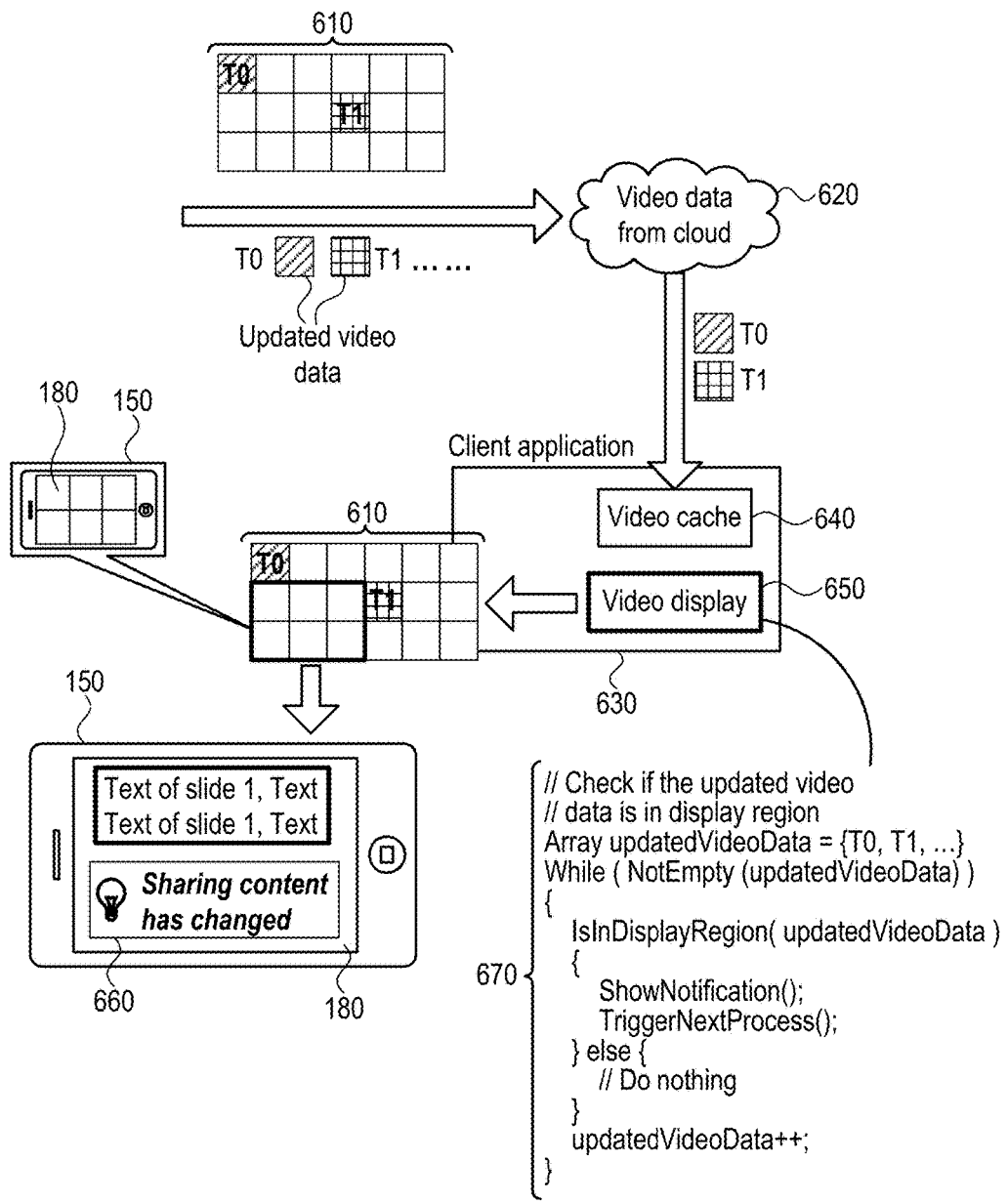
FIG. 6 is a depiction of an embodiment as described with reference to FIGS. 1 and 2.

Reference is now made to FIG. 6, which is a depiction of an embodiment as described with reference to of FIGS. 1 and 2. In the embodiment depicted in FIG. 6, an application programming interface (API), which is available for use by a client application, such as, but not limited to an on-line meeting application, located in the mobile device 150, is utilized by hardware or software implementing embodiments of the present invention, in order to indicate if the display screen 180 is displaying an enlarged version of the display.

Such APIs are well known in the art. The API may have an object or method enabling the client application to determine zoom density. If there is no appropriate API based method for determining if the display screen 180 is displaying an enlarged version of the display or not (i.e. zoom density), the client application can use techniques known in the art in order to detect if the displayed content is zoomed in on, by comparing display screen 180 data with data from the original (i.e. the non-zoomed) video data such as the first slide 120 (FIG. 1) and the presentation 210 (FIG. 2).

For Android devices, for example, a WebSettings.Zoom-Density object would be used to detect if the display screen 180 is displaying an enlarged version of the display. Apple devices use the uses zoomScale property to indicate zoom level.

A video image, such as the video image which is to be displayed on the display screen 180 is logically dividable into a plurality of small blocks 610. Of particular interest for the sake of this example are two of the plurality of small blocks 610, a first one of the plurality of small blocks 610, denoted block T0, and a second one of the plurality of small blocks 610, denoted block T1. The two blocks T0 and T1 are received as part of the video image to be displayed on the display screen 180 in updated video data received by the mobile device 150 from the cloud 620.

The mobile device 150, as noted above, comprises the client application 630. The client application 630 comprises a video cache 640, the utilization of which is described below, and the video display 650. The GUI 520 (FIG. 5) may be implemented in the video display 650. As depicted in FIG. 6, each of the plurality of small blocks 610 is compared by the video client application 650 to the display screen 180 of the mobile device 150. For example, the received block T0 is compared, using conventional methods, to the display on the display screen 180 of the mobile device 150. In the present example, as a result of the comparing, block T0 is found not to match the corresponding portion of the display on the display screen 180 of the mobile device 150. Received block T1 is also compared to the display on the display screen 180 of the mobile device 150. If, for example, as a result of the comparing, block T1 is found not to match the display on the display screen 180 of the mobile device 150, in that no block of the plurality of small blocks 610 is found to match the video displayed on the display screen 180 of the mobile device 150, a notice, such as "Sharing Content Has Changed" 660 then is made, by the client application 630, to appear on the display screen 180 of the mobile device 150.

However, if the display screen 180 of the mobile device 150 is found to match one of the plurality of small blocks 610, such as one of block T0 or block T1, then the client application 630 takes no action (note that this scenario is not depicted).

FIG. 6 also shows a block of pseudo-code 670, repeated here, for ease of description, which summarizes the above described method:

```
                        // check if the updated video data is in
display region
            Array updatedVideoData = {T0, T1, ...}
            While (NotEmpty(updatedVideoData))
            {
                IsInDisplayRegion(updatedVideoData)
                {
                    ShowNotification( );
                    TriggerNextProcess( );
                }
                Else
                {
                    // Do nothing
                }
                updatedVideoData++
            }
```

Figure 7:
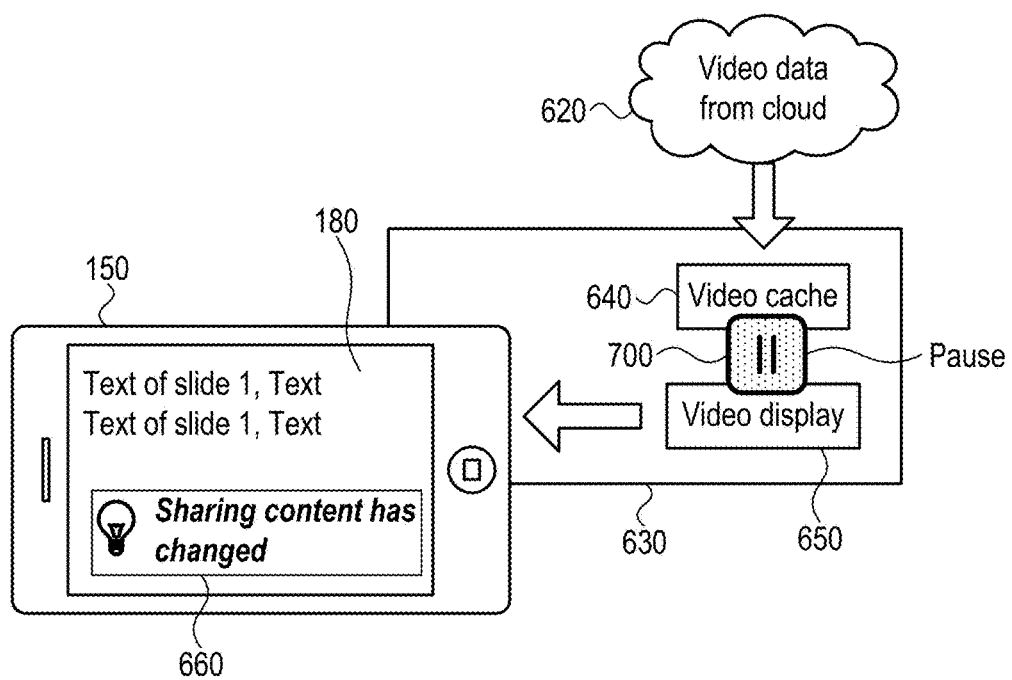
FIG. 7 is a depiction of the embodiment depicted in FIG. 6, where video is being paused.

Reference is now additionally made to FIG. 7, which a depiction of the embodiment depicted in FIG. 6, where video is being paused 700. As was noted above, once the attendee 140 (FIG. 1) of the mobile device 150 has zoomed in on or enlarged video appearing on the display screen 180, and an update is received (i.e. the method described immediately above determines that a slide in a video presentation has been changed), the received video is cached in the video cache 640 until the attendee 140 (FIG. 1) releases the paused 700 display by actuating the video display 180, for example, by double clicking the display (as depicted in FIG. 4).

Alternatively, a still video frame of the newly received video content can be saved as a photo in a folder, such as a Picture folder, in the mobile device 150. When the attendee 140 (FIG. 1) is ready to update the screen, the still photo of the latest shared content is then retrieved from the folder and displayed on the display screen 180.

Figure 8A:
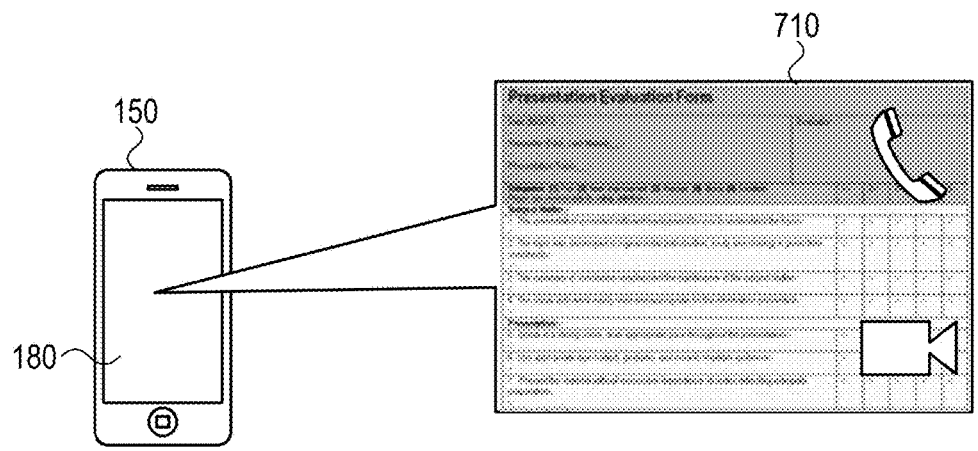
FIG. 8A is a pictorial illustration of the mobile device of FIGS. 1 and 2 displaying a document displayed by a presenter.

It is appreciated that, in addition to zooming in to view slides in a presentation, the zoom feature may also be of use in other common on-line meeting situations. Examples where this is the case are provided in FIGS. 8A-8C. FIG. 8A is a pictorial illustration of the mobile device 150 of FIGS. 1 and 2 displaying a document 710 displayed by a presenter (e.g., meeting host 110 (FIG. 1)). Because the presenter typically displays the document 710 on a device with a larger display screen (for instance on a desktop or laptop computer) than is available on the device 150, the document 710 appears fuzzy or out of focus on the display screen 180. Thus the user of device 150 (e.g. mobile attendee 140 (FIG. 1)) might zoom in, in order to have a clearer view of the document 710.

Figure 8B:
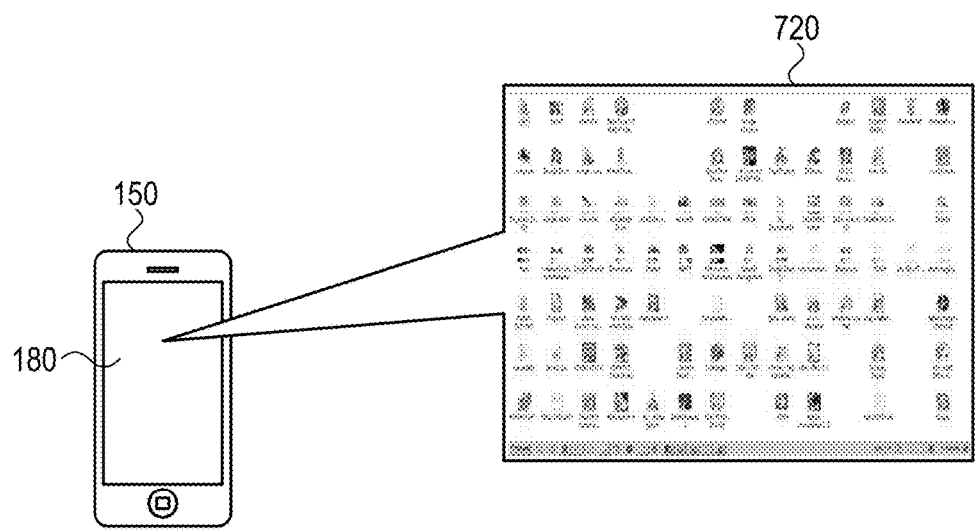
FIG. 8B is a pictorial illustration of the mobile device of FIGS. 1 and 2 displaying the presenter's desktop.

FIG. 8B is a pictorial illustration of the mobile device 150 of FIGS. 1 and 2 displaying the presenter's desktop 720. Again, because the presenter's desktop 720 is typically displayed on a device with a larger display screen (i.e. a desktop or laptop computer) than is available on the device 150, the desktop 720 appears fuzzy or out of focus on the display screen 180. Thus the user of device 150 (e.g. mobile attendee 140 (FIG. 1)) might zoom in, in order to have a clearer view of the presenter's desktop 720.

Figure 8C:
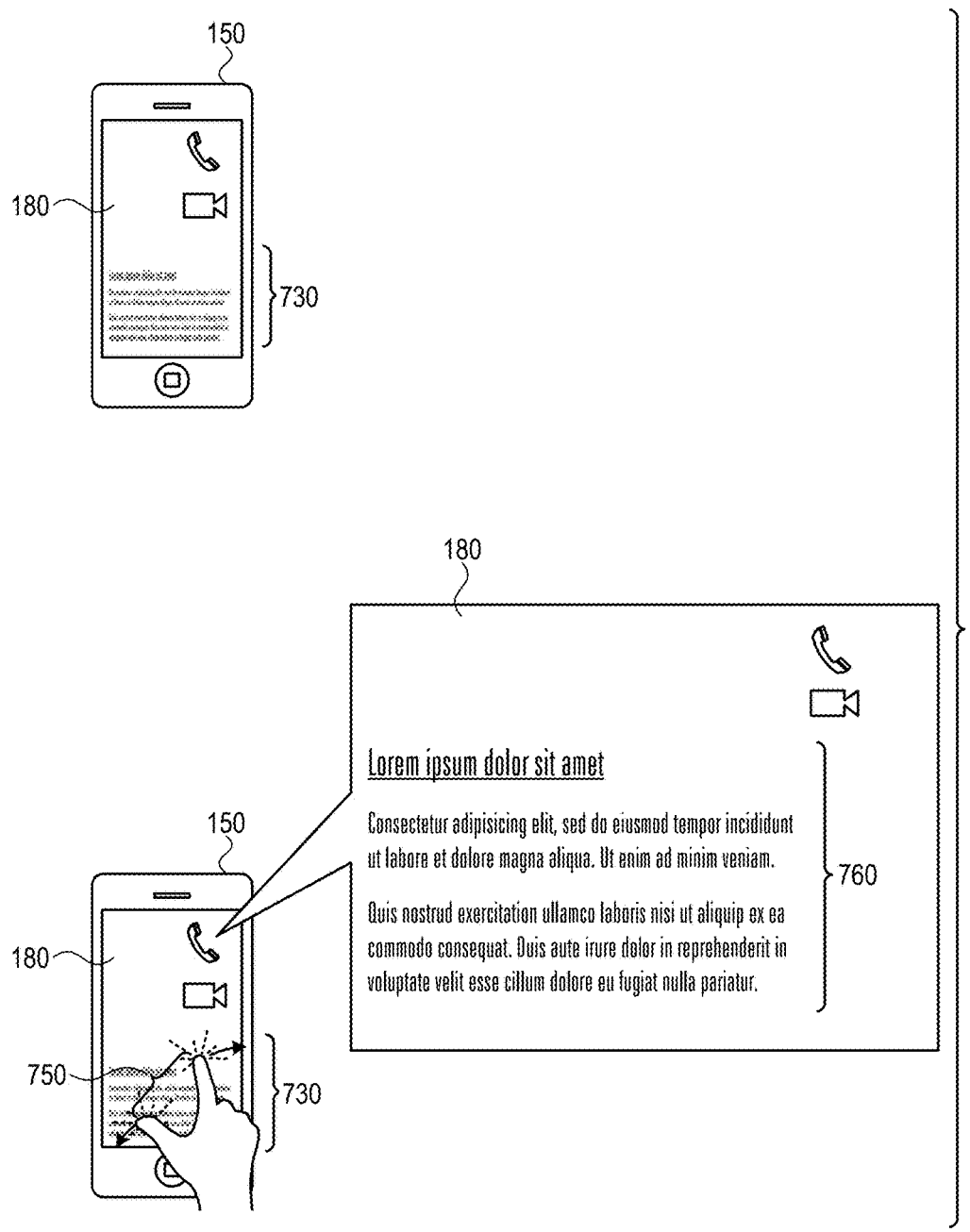
FIG. 8C is a pictorial illustration of the mobile device of FIGS. 1 and 2 in portrait mode, viewing shared content.

FIG. 8C is a pictorial illustration of the mobile device 150 of FIGS. 1 and 2 in portrait mode viewing shared content 730. Because the shared content 730 appears very small on the device 150, when the device 150 is in portrait mode, and the user (e.g., meeting host 110 (FIG. 1)) is able to "pinch" and enlarge the display 750, so that the shared content 730 now appears enlarged 760 on the display 180.

Figure 8D:
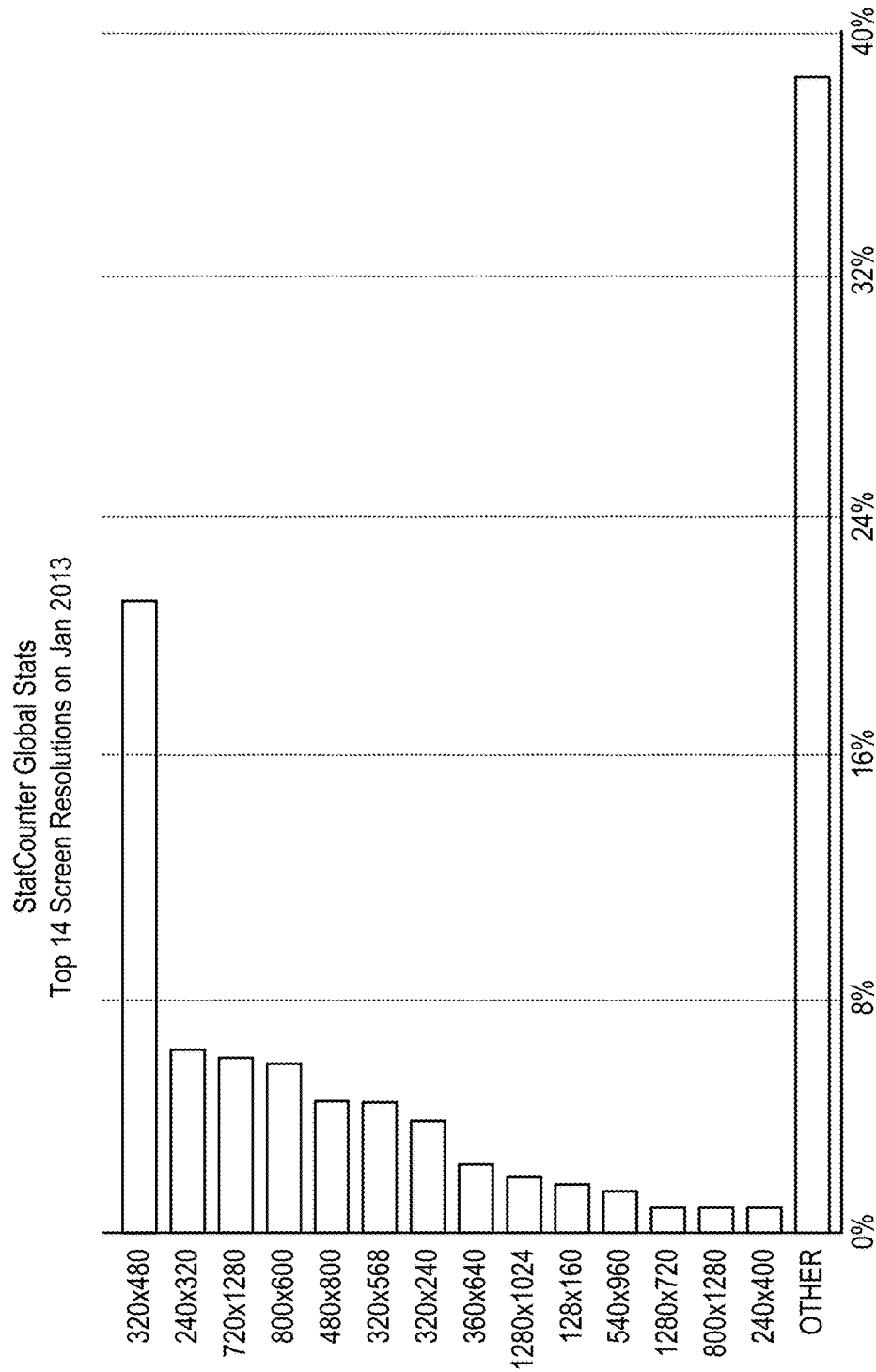
FIG. 8D is a graphical presentation of the top 14 screen resolutions used in the mobile device of FIGS. 1 and 2, as of January 2013.

Reference is now made to FIG. 8D, which is a graphical presentation of the top 14 screen resolutions used in the mobile device of FIGS. 1 and 2, as of January 2013. FIG. 8D is brought by way of support for the discussion, inter-alia, of FIGS. 8A-8C. These statistics can be found at: gs.statcounter.com/#mobile_resolution-ww-monthly-201301-201301-bar.

As was noted above with reference to FIG. 2, even when the attendee 140 (FIG. 1) is not pausing the video stream, the attendee's 140 (FIG. 1) video is delayed—in the example of FIG. 2, by 9 seconds. The inventors of the present invention have noticed delay times between 3-10 seconds when performing tests on a Cisco internal WiFi network. The term "delay time" refers to the amount of time it takes the video image to go from the meeting host's 110 (FIG. 1) device to a meeting server (see below, with reference to FIG. 9), and then to the mobile attendee's 140 device. It is also believed by the inventors of the present invention that the Cisco internal WiFi network is typically a better network than most 3G networks. The following table shows six different delay times, from various test presentations.

| Test Number | Host 110 (FIG. 1) | Attendee 140 (FIG. 1) | Delay (sec) |
|---|---|---|---|
| 1 | 0:29 | 0:20 | 9 |
| 2 | 0:26 | 0:20 | 6 |
| 3 | 0:23 | 0:20 | 3 |
| 4 | 0:23 | 0:20 | 3 |
| 5 | 0:30 | 0:20 | 10 |
| 6 | 0:25 | 0:20 | 5 |

Figure 9:
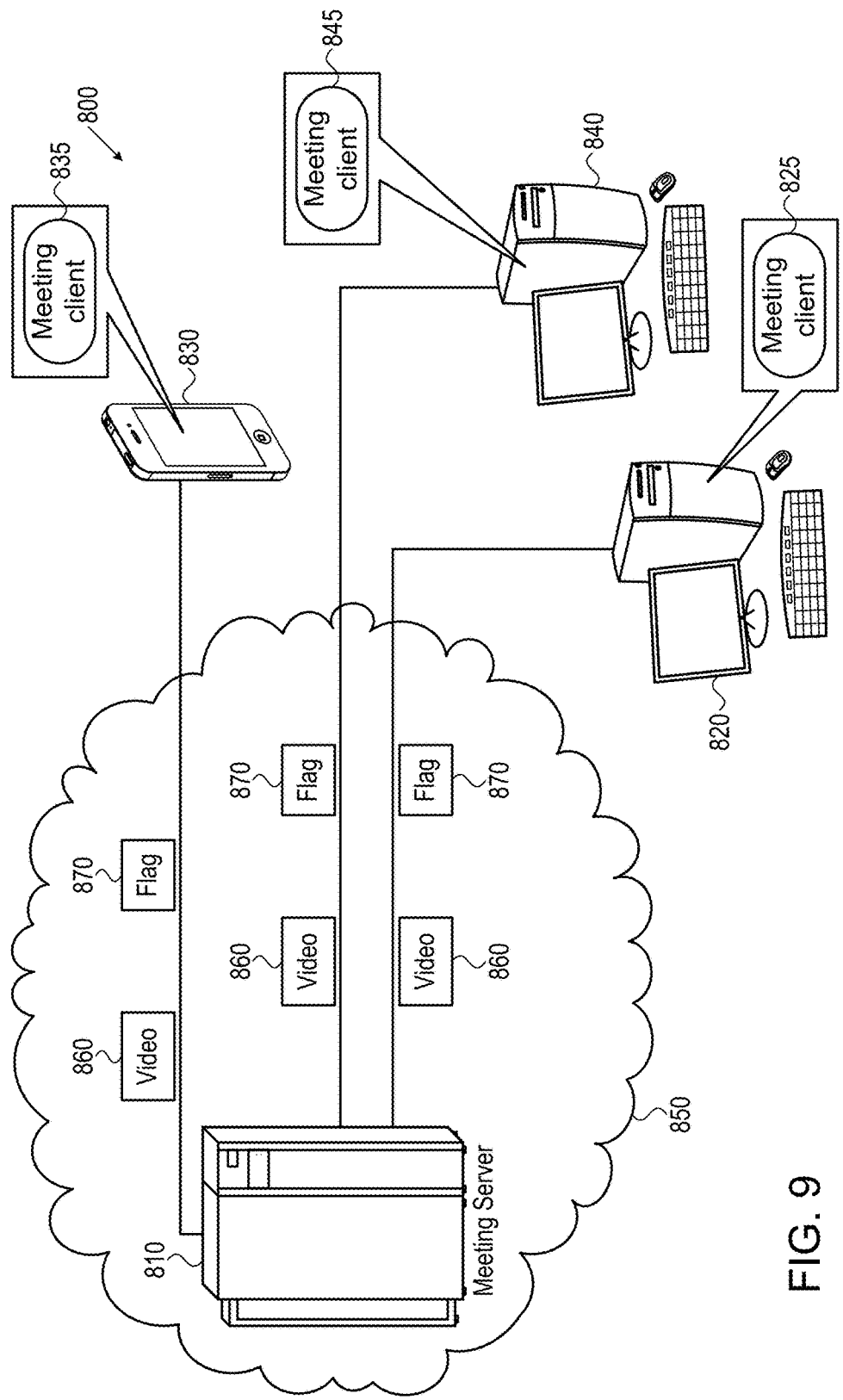
FIG. 9 is a block diagram of a client-server architecture for the on-line meetings attended using mobile device of FIGS. 1 and 2.

Reference is now additionally made to FIG. 9, which is a block diagram of a client-server architecture 800 for on-line meetings attended using mobile device of FIGS. 1 and 2. A meeting server 810 manages the connection between a meeting host 820 and the meeting attendees' devices 830, 840 (corresponding to device 150 of attendee 140 (FIG. 1)). The meeting host 820 comprises a meeting client 825. Similarly, the meeting attendees' devices 830, 840 also comprise meeting clients 835, 845. Meeting clients 825, 835, and 845 correspond to client application 630 (FIG. 5). In order to stress that the attendee's device may be using either a mobile device 830 comprising the meeting client 835 or a desktop device 840 comprising the meeting client 845, both are depicted in FIG. 9. As was noted above, references to the mobile device 150 (FIG. 1, emphasis added) of the attendee 140 (FIG. 1) are by way of example, and not meant to be limiting. Furthermore, it is appreciated that even if the devices 830 and 840 are both mobile devices, devices 830 and 840 would not necessarily have the same operating system, or the same network environment.

The inventors of the present invention believe that, at least in part, the lag between the host 820 and the attendees' device 830, 840 is caused by video data size and the capability of the meeting server 810 and network 850. As is known in the art, at present, video meeting technology only transfers regions of the video image which change. So, when the host 820 changes a presentation from a first slide to a second slide, as is depicted in FIG. 1, only then will the changed regions be sent to the attendee devices 830, 840. It is appreciated that sending only video image regions which change is standard in video protocols, whether those protocols are members of the MPEG suites of protocols or they are proprietary protocols. Accordingly, when a large portion of the second slide is changed relative to the first slide, the delay time for the arrival of the video packets 860 at the attendees' device 830, 840 are expected to be correspondingly large (i.e. closer to, or even exceeding, the 10 second delay noted above in the table). When the changes between the two slides are minor, the delay will correspondingly be small (i.e. closer to the 3 second delay noted in the table).

This supports the contention that delay time is, at least in part, related to video data size. I.e., the more video packets 860 and associated data which needs to be transferred to the devices 830, 840, the more time the meeting server 810 requires to collect, package, compress, transfer, and cache the data. This leads to correspondingly larger delay times.

As the meeting host 820 is progressing to the next slide, while the meeting server 810 is processing the video packets 860 and associated data—i.e. collecting, packaging, compressing, transferring, and caching the video packets 860 and associated data—the meeting client 825 comprised in the meeting host 820 can, additionally, bypass these steps and send a notification flag 870 to the meeting client 835, 845 comprised in meeting attendee's devices 830, 840. The notification flag 870 may be as small as a single byte, and there is no need for the meeting client 825 comprised in the meeting host 820 to perform the steps of collecting, packaging, compressing, transferring, and caching data in order to send the notification flag 870 to the meeting clients 835, 845 comprised in the attendees' devices 830, 840. As such, the notification flag 870 should arrive at the attendees' devices 830, 840 faster than the actual video data arrives.

The arrival of the notification flag 870 at the attendees' devices 830, 840 will enable the meeting client 835, 845 comprised in attendees' devices 830, 840 to receive a notification that a change of the video content is imminent (see, for example, item 310 in FIG. 3 and item 410 in FIG. 4). The arrival of the notification flag 870 will enable the attendees (i.e. attendee 140 (FIG. 1)) of the meeting to interact with the GUI 520 (FIG. 5), and either pause the video or advance to the new slide when the update video packets 860 arrive at the meeting client 835, 845. This process is described below in greater detail.

Figure 10:
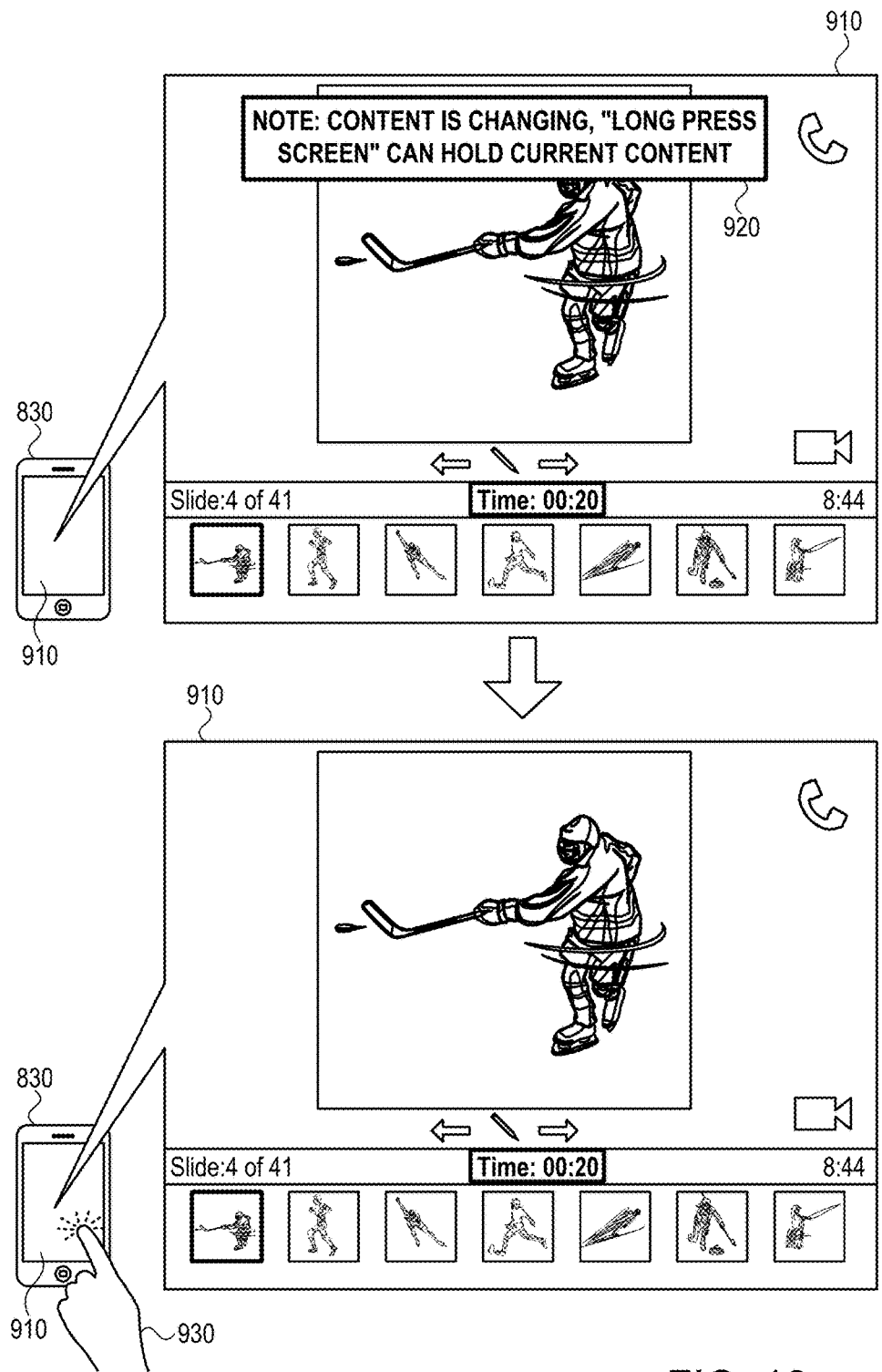
FIG. 10 is a depiction of an embodiment of the present invention described with reference to FIG. 9.

Reference is now additionally made to FIG. 10, which is a depiction of an embodiment of the present invention described with reference to FIG. 9. A meeting attendee's 140 (FIG. 1) device 830 is depicted in FIG. 10 which corresponds, in a non-limiting fashion, to mobile device 830 of FIG. 9. After the mobile device 830 receives the notification flag 870, the display 910 of the mobile device 830 shows a notification 920 that a change of the video content is imminent. For example, and without limiting the generality of the foregoing, the display 910 shows the notification 920, "CONTENT IS CHANGING, 'LONG SCREEN PRESS CAN HOLD CURRENT CONTENT".

As depicted in the lower portion of FIG. 10, when the user 930 performs a long press on the display screen 910 of the device 830, the video content on the display 910 (e.g. the slide show of FIGS. 1 and 2) can be paused. Once the long press is ended, the video content stored in the cache can then be displayed.

It is appreciated that the video is paused only on the display of the device 830 where the user 930 is performing the long press. The displays of other users and the presentation of the meeting host are unaffected. In both this and in other embodiments of the present invention described herein, it is appreciated that, in some embodiments, the presenter (corresponding to meeting host 110 (FIG. 1)) may receive a notification that the attendee 830 and 140 (FIG. 1) are either pausing or zooming the displayed video. Providing this notification to the presenter (corresponding to meeting host 110 (FIG. 1)) enables the presenter (corresponding to meeting host 110 (FIG. 1)) to tailor the speed and zoom of the presentation to satisfy a majority or large plurality of attendees 830 and 140 (FIG. 1). Providing this notification also can enhance collaboration between the presenter/meeting host 820 and 110 (FIG. 1) and the attendees 830 and 140 (FIG. 1). Additionally, enabling the presenter/meeting host 820 and 110 (FIG. 1) to increase the responsiveness of the viewing practices of the attendees 830 and 140 (FIG. 1) will improve the user experience of the attendees 830 and 140 (FIG. 1).

It is also appreciated that the use of "long press" as a way for the user to interact with the GUI 520 (FIG. 5) is provided by way of example, and other appropriate interactions or actuations, for instance double clicking, which are well known in the art, may be used as well in an actual implementation of the present invention, e.g. for pausing and un-pausing the display. In some embodiments, where the device 830 supports such implementations, a voice command may be used to pause the video. Additionally, where supported, facial or eye motion may also be used to pause the video.

Figure 11:
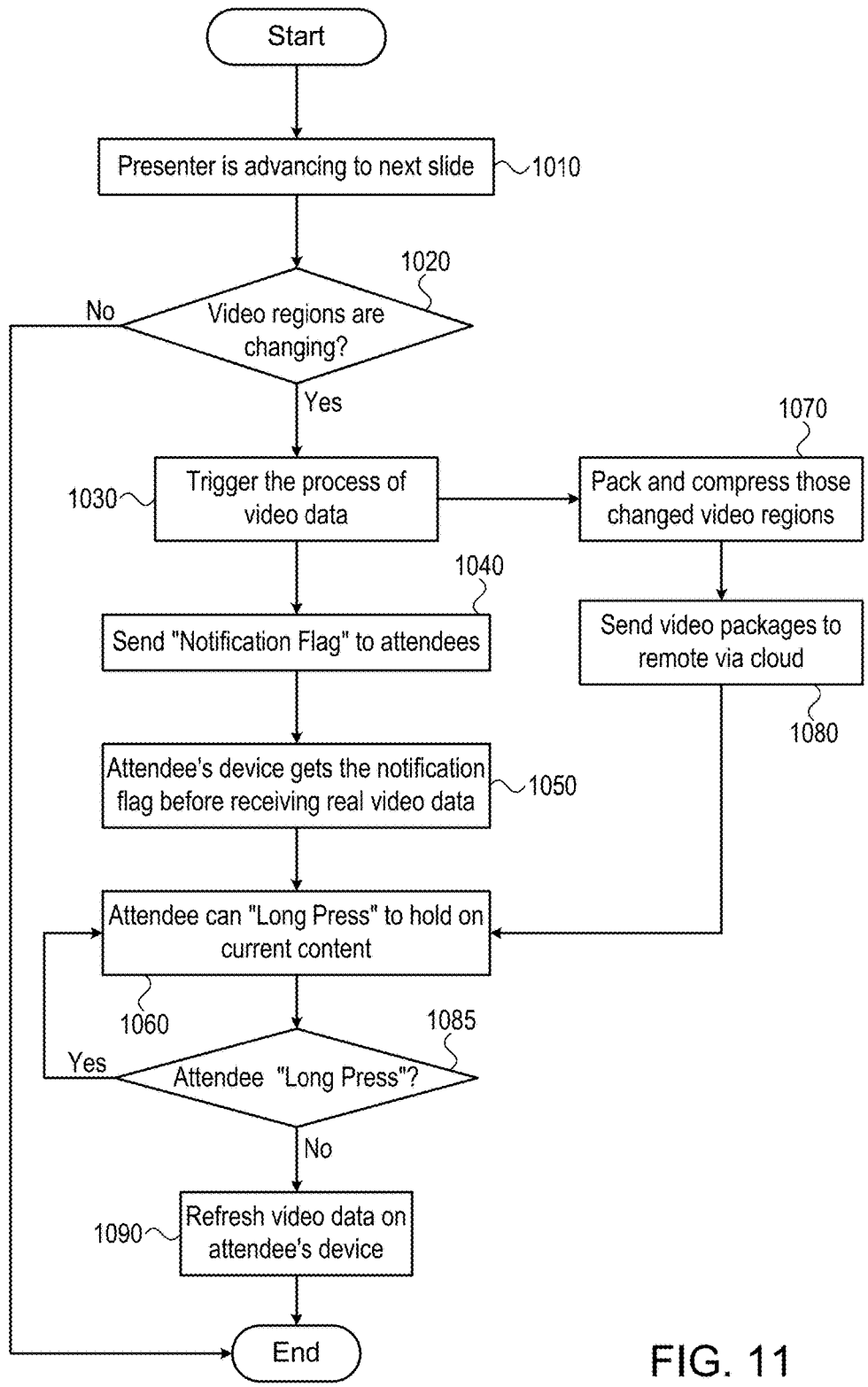
FIG. 11 is a simplified flowchart of the method described with reference to FIGS. 9 and 10.

Reference is now additionally made to FIG. 11, which is a simplified flowchart of the method described above with reference to FIGS. 9 and 10. In step 1010 the presenter, who may be the meeting host 110 (FIG. 1), advances a slide show to the next slide. In step 1020, the meeting client 825 determines if video regions displayed in the new slide are changing or not. One method for performing this determination is provided above, with reference to FIG. 6. If it is determined that there are no changes in video regions displayed, then the method ends until the next time the presenter advances to the next slide, and then the method returns to step 1010. If the meeting client 825 determines that the video regions are changing in the new slide (step 1030), then two parallel processes are triggered.

In one of the two triggered parallel processes, the notification flag 870 is sent to devices of users (i.e. attendees) 930 (step 1040), such as the device 830, and mobile device 150 (FIG. 1). For the reasons explained above, the device 830 of the user 930 gets the notification flag 870 before any video data packets 860 are received (step 1050). In step 1060, the user 930 is prompted to execute a long press of the display 910 of the device 830, in order to pause the video from progressing.

In the second of the two parallel processes, the meeting server 810 packages, compresses, etc. the video packets 860 (step 1070). The packaged, compressed, etc. video packets 860 from step 1070 are then sent by the meeting server 810 to the cloud 850 for distribution to the meeting attendees' (remote) devices 830, 840 (step 1080). The method then returns to step 1060 and the user 930 is prompted to execute a long press of the display 910 of the device 830, in order to pause the video from progressing.

In step 1085 the device 830, 840 evaluates if the user 930 is continuing the long press. While the long press is maintained by the user 930, the device 830, 840 continues to loop to step 1060, enabling the user 930 to continue the long press. However, once the user 930 stops the long press, then in step video data appearing on the display screen 910 is refreshed by displaying the currently cached video data on the display screen 910 (step 1090).

Figure 12:
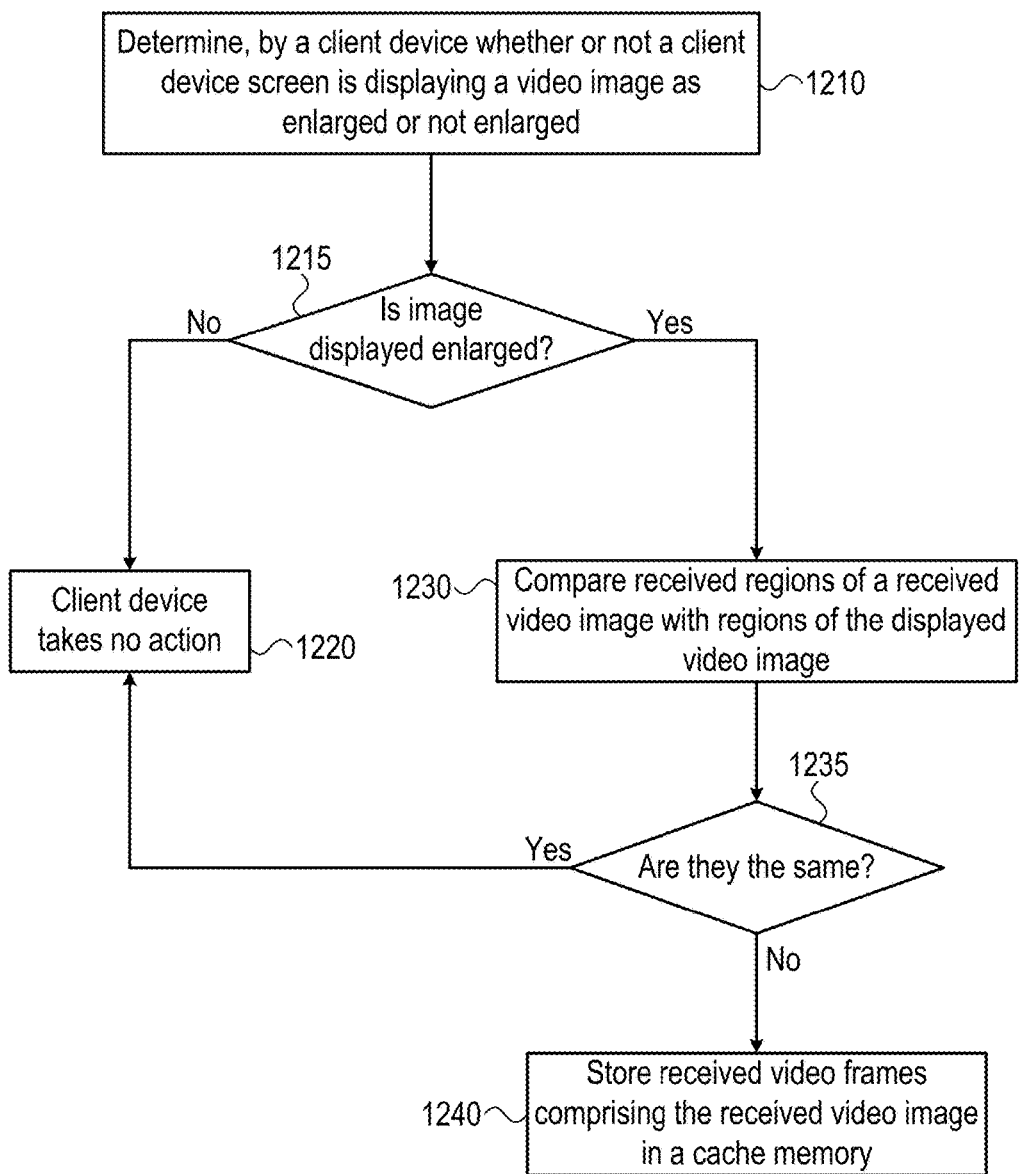
FIG. 12 is a simplified flowchart of a method of implementation of an embodiment of the present invention.

Reference is now made to FIG. 12, which is a simplified flowchart of a method of implementation of an embodiment of the present invention. In step 1210, the client device (such as device 830, 840) determines whether or not the client device display screen (such as the display screen 180 (FIG. 1)) is displaying a video image as enlarged or not enlarged. In step 1215, the method forks, and proceeds to step 1220 if the client device display screen (such as the display screen 180 (FIG. 1)) is not displaying the video image as enlarged. In that case, the client device (such as device 830, 840) takes no action. If, however, the client device display screen (such as the display screen 180 (FIG. 1)) is displaying the video image as enlarged, the method proceeds to step 1230, and compares received regions of a received video image with regions of the displayed video image. In step 1235, it is determined that the regions of a received video image are the same as the compared regions of the displayed video image, then the method proceed to step 1220, and the client device (such as device 830, 840) takes no action. However, if it is determined that the regions of a received video image are not the same as the compared regions of the displayed video image, then the method proceed to step 1240, and received video frames comprising the received video image are stored in a cache memory.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method implemented in a video receiving client device, the method comprising:
   determining by the client device that a display screen of the client device is displaying a received first video image in a video stream comprising part of a video conference, the image being displayed as enlarged;
   receiving, at the client device, a second video image in the video stream comprising part of the video conference;
   comparing regions of the received second video image with regions of the displayed received first video image;
   determining that the compared regions of the received second video image are different from the regions of the displayed received first video image; and
   storing, as a positive result of the determining, received video frames comprising the received second video image in a cache memory.

2. The method according to claim 1 and further comprising displaying the stored received video frames upon an actuation of the display screen of the client device.

3. The method according to claim 1 wherein in response to an actuation of the display screen of the client device, the display screen of the client device changes from a state where the displayed received first video image is enlarged to a state where the received second video image is displayed as no longer enlarged.

4. The method according to claim 1 and further comprising pausing the displayed received first video image upon an actuation of the display screen of the client device and storing the received video frames in the cache memory regardless of whether the client device has determined that the displayed received first video image is enlarged or not.

5. The method according to claim 4 and wherein a remote host receives notification that the display screen of the client device has been actuated.

6. The method according to claim 5 and wherein the notification comprises a notification that the displayed received first video image has been paused.

7. The method according to claim 4 wherein the actuation comprises one of:
   a touch actuation;
   a voice command;
   a facial motion; and
   an eye motion.

8. The method according to claim 4 and further comprising sending a notification flag to the client device when a presenter is changing content to be sent to the display screen of the client device.

9. The method according to claim 8 wherein, in response to receiving the notification flag, a notification appears on the display screen of the client device indicating that a presenter has changed content which is to he displayed.

10. The method according to claim 9 wherein, in response to the notification, an actuation of the display screen of the client device causes the displayed received first video image to pause.

11. The method according to claim 10 wherein, when the displayed received first video image is paused received video frames are stored in cache memory.

12. A system implemented in a video receiving client device, the system comprising:
   a processor which determines that a display screen of the client device is displaying a received first video image in a video stream comprising part of a video conference, the image displayed as an enlarged video image;
   a client device video cache which receives a second video image in the video stream comprising part of the video conference;
   a client application which compares regions of the received second video image with regions of the displayed received first video image and
   a storage device which store received video frames comprising the received second video image in a cache memory upon a positive determination by the client application that the compared regions of the received second video image are different from the regions of the displayed received first video image.

13. The system according w claim 12 and further comprising the stored received video frames being displayed upon an actuation of the display screen of the client device.

14. The system according to claim 12 wherein in response to an actuation of the display screen of the client device, the display screen of the client device change from a state where the video image is displayed as no longer enlarged.

15. The system according to claim 12 and further comprising, upon an actuation of the display screen of the client device, the display is paused, and the received video frames are stored in the storage device cache memory, regardless of whether the client device has determined that the display is enlarged or not.

16. The system according to claim 15 and wherein a remote host receives notification that the display screen of the client device has been actuated.

17. The system according to claim 15 wherein the actuation comprises one of:
   a touch actuation;
   a voice command;

a facial motion; and an eye motion.

18. The system according to claim 15 and further comprising a notification flag which is sent to the client device when a presenter is changing content to be sent to the display screen of the client device.

19. The system according to claim 18 wherein, in response to receiving the notification flag, a notification appears on the display screen of the client device indicating that a presenter has changed content which is to be displayed.

20. The system according to claim 19 wherein, in response to the notification, an actuation of the display screen of the client device causes the displayed received first video image to pause.

\* \* \* \* \*

UNITED STATES PATENT AND TRADEMARK OFFICE
CERTIFICATE OF CORRECTION

PATENT NO. : 9,560,095 B2
APPLICATION NO. : 14/501136
DATED : January 31, 2017
INVENTOR(S) : Qi Shi et al.

Page 1 of 1

It is certified that error appears in the above-identified patent and that said Letters Patent is hereby corrected as shown below:

In the Claims

Column 10, Line 22, Claim 9, "he" to read as --be--.

Column 10, Line 28, Claim 11, "paused" to read as --paused,--.

Column 10, Line 35, Claim 12, "the image" to read as --the image being--.

Column 10, Line 41, Claim 12, "image and" to read as --image; and--.

Column 10, Line 42, Claim 12, "store" to read as --stores--.

Column 10, Line 48, Claim 13, "w" to read as --to--.

Column 10, Line 53, Claim 14, "change" to read as --changes--.

Column 10, Lines 53-54, Claim 14, after "where the" insert --displayed received first video image is enlarged to a state where the received second--.

Signed and Sealed this
Twenty-third Day of May, 2017

Michelle K. Lee
*Director of the United States Patent and Trademark Office*